US012654797B2

(12) United States Patent
Miotto et al.

(10) Patent No.: US 12,654,797 B2
(45) Date of Patent: Jun. 16, 2026

(54) SNOWMOBILE EMERGENCY FLOTATION DEVICE

(71) Applicants: Kathleen Miotto, Island Park, NY (US); James Miotto, Island Park, NY (US)

(72) Inventors: Kathleen Miotto, Island Park, NY (US); James Miotto, Island Park, NY (US)

( * ) Notice: Subject to any disclaimer, the term of this patent is extended or adjusted under 35 U.S.C. 154(b) by 396 days.

(21) Appl. No.: 17/834,047

(22) Filed: Jun. 7, 2022

(65) Prior Publication Data

US 2022/0411002 A1     Dec. 29, 2022

Related U.S. Application Data

(60) Provisional application No. 63/213,972, filed on Jun. 23, 2021.

(51) Int. Cl.
B62J 27/20     (2020.01)
B62J 45/41     (2020.01)
B63C 9/22      (2006.01)

(52) U.S. Cl.
CPC .............. B62J 27/20 (2020.02); B62J 45/41 (2020.02); B63C 9/22 (2013.01)

(58) Field of Classification Search
CPC .... B63C 9/00; B63C 9/22; B63C 9/23; B63C 9/28; B63C 9/32; B62J 27/20; B62J 45/41

USPC .............................................. 441/80, 82, 136
See application file for complete search history.

(56)                  References Cited

U.S. PATENT DOCUMENTS

| | | | | |
|---|---|---|---|---|
| 5,150,662 | A * | 9/1992 | Boyd | B60F 3/0076 |
| | | | | 180/190 |
| 5,682,832 | A * | 11/1997 | Millard | B60F 3/0076 |
| | | | | 114/123 |
| 6,070,546 | A * | 6/2000 | Downey | B62M 27/02 |
| | | | | 114/123 |
| 6,347,970 | B1 * | 2/2002 | Weinel | B63C 7/10 |
| | | | | 441/80 |

* cited by examiner

*Primary Examiner* — Daniel V Venne
(74) *Attorney, Agent, or Firm* — Brennan, Manna & Diamond, LLC

(57)                  ABSTRACT

The present invention relates generally to the field of snowmobiles and other recreational devices. More specifically, the present invention relates to a snowmobile emergency flotation device. The device is primarily comprised of a body having at least one door and at least one inflatable air bag contained therein. The device can be secured to the front ski and/or running board of a snowmobile. The device is further comprised of at least one water sensor that automatically activates the air bag such that the air bag extends outwards from the body and inflates when the water sensor is submerged. The air bag may also be activated by a manual switch. Once inflated, the air bag prevents the snowmobile the device is attached to from sinking into a body of water.

20 Claims, 5 Drawing Sheets

SNOWMOBILE EMERGENCY FLOTATION DEVICE

CROSS-REFERENCE TO RELATED APPLICATION

The present application claims priority to, and the benefit of, U.S. Provisional Application No. 63/213,972, which was filed on Jun. 23, 2021, and is incorporated herein by reference in its entirety.

FIELD OF THE INVENTION

The present invention relates generally to the field of snowmobiles and other recreational vehicles. More specifically, the present invention relates to a snowmobile emergency flotation device. The device is primarily comprised of a body having at least one door or access panel and at least one inflatable air bag contained therein. The device can be secured to the front ski and/or running board of a snowmobile, or elsewhere on other recreational type vehicles. The device is further comprised of at least one water sensor that automatically activates the air bag such that the air bag extends outwardly from the body and inflates when the water sensor is submerged. The air bag may also be activated by a manual switch. Once inflated, the air bag prevents the snowmobile or other device attached thereto from sinking into a body of water and imperiling its operator. Accordingly, the present disclosure makes specific reference thereto. Nonetheless, it is to be appreciated that aspects of the present invention are also equally applicable to other like applications, devices and methods of manufacture.

BACKGROUND

Many individuals enjoying riding snowmobiles during the winter for fun and enjoyment. Further, game wardens often use snowmobiles to patrol various snow-covered areas within their jurisdiction. If a snowmobile rider attempts to cross a frozen lake or pond, there is always a possibility that the ice may collapse and cause the snowmobile to become submerged into the freezing water. This is extremely dangerous because if the rider also falls into the water, he or she can suffer hypothermia and potentially drown. In addition, the snowmobile will sink into the body of water, thereby destroying the snowmobile and rendering it unsalvageable.

Therefore, there exists a long-felt need in the art for a device that prevents a snowmobile or other recreational device from sinking into a body of water. In addition, there exists a long-felt need in the art for a snowmobile emergency flotation device that prevents a snowmobile rider from drowning if the snowmobile ends up in a body of water. Further, there is a long-felt need in the art for a snowmobile emergency flotation device that automatically deploys when a snowmobile encounters a body of water. Finally, there is a long-felt need in the art for a snowmobile emergency flotation device that is relatively inexpensive to manufacture and that is both safe and easy to use.

The subject matter disclosed and claimed herein, in one embodiment thereof, comprises a snowmobile emergency flotation device. The device is primarily comprised of a body having at least one repositionable access panel or door and at least one inflatable air bag stored therein until deployed. The device can be secured to the front ski and/or running board of a snowmobile or elsewhere along other types of recreational vehicles. The device is further comprised of at least one water sensor that automatically activates the air bag, such that the air bag extends outwardly from the body through the access panel/door, and inflates when the water sensor is submerged in a body of water. The air bag may also be activated by a manual switch as a fail-safe in the event that the water sensor fails or otherwise does not cause the air bag to deploy when desired. Once inflated, the air bag prevents the snowmobile or other device to which it is attached from sinking into a body of water.

In this manner, the snowmobile emergency flotation device of the present invention accomplishes all of the forgoing objectives and provides a device that prevents a snowmobile or other recreational device from sinking into a body of water. The device also prevents the rider from drowning if the snowmobile or other recreational device enters into a body of water. Further, the device automatically deploys when the recreational device to which it is attached enters a body of water.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a snowmobile emergency flotation device. The device is primarily comprised of a body further comprised of at least one door and at least one inflatable air bag. In the preferred embodiment of the device, the body is manufactured from a durable metal a rigid plastic. In differing embodiments, the body may further be any color in the art and may be transparent, semi-transparent or opaque. In addition, the body may be comprised of a plurality of indicia such as, but not limited to, patterns, logos, emblems, images, symbols, designs, letters, numbers, words, characters, animals, advertisements, brands, etc.

The body is preferably generally rectangular in shape and is comprised of a top surface and generally parallel bottom surface, a pair of generally parallel side surfaces, and a rear surface and a generally parallel front surface. In one embodiment, the device may be secured to the top surface of a front ski of a snowmobile. In another embodiment, the device may be secured to the bottom surface of a running board of a snowmobile. In order to secure the body of the device to a front ski and/or running board, the body is further comprised of at least one fastener. In a differing embodiment, the body may be inseparably attached to the ski and running board from the factory. The front surface of the body is further comprised of at least one, but preferably two swinging doors. In an embodiment with two doors, a first door attaches to the top surface via at least one hinge and a second door attaches to the bottom surface via at least one hinge. The at least one hinge is preferably a spring-loaded hinge, such that the doors remain closed until the device is activated. The doors further preferably only open outwards (i.e., away from the device).

The top surface, side surfaces, bottom surface, and/or rear surface is further comprised of at least one water sensor and at least one manual switch. At least one inflatable air bag is further stored within the body. The air bag is further comprised of at least one ignitor and at least one chemical. Once the water sensor is submerged in water, the sensor sends an electrical communication to the ignitor which creates a spark within the air bag and causes the chemical to ignite, such that the air bag rapidly expands and pushes through the doors and travels outside of and away from the body and the snowmobile. Once fully inflated, the air bag becomes buoyant such that the snowmobile floats. The manual switch may also allow a user to manually send the electrical communication to the ignitor to activate the air bag. In one embodiment, the switch may be located on an area of the snowmobile such as, but not limited to, the body and/or handlebars. Further, in said embodiment, multiple devices may be routed to a singular switch such that a user can activate the air bag of each device simultaneously.

Accordingly, the snowmobile emergency flotation device of the present invention is particularly advantageous as it provides a device that prevents a snowmobile from sinking if the snowmobile falls into a body of water and also prevents a snowmobile rider from drowning if the snowmobile falls into a body of water. In addition, the device automatically deploys when a snowmobile falls into a body of water. In this manner, the snowmobile emergency flotation device protects snowmobiles and snowmobiles riders.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
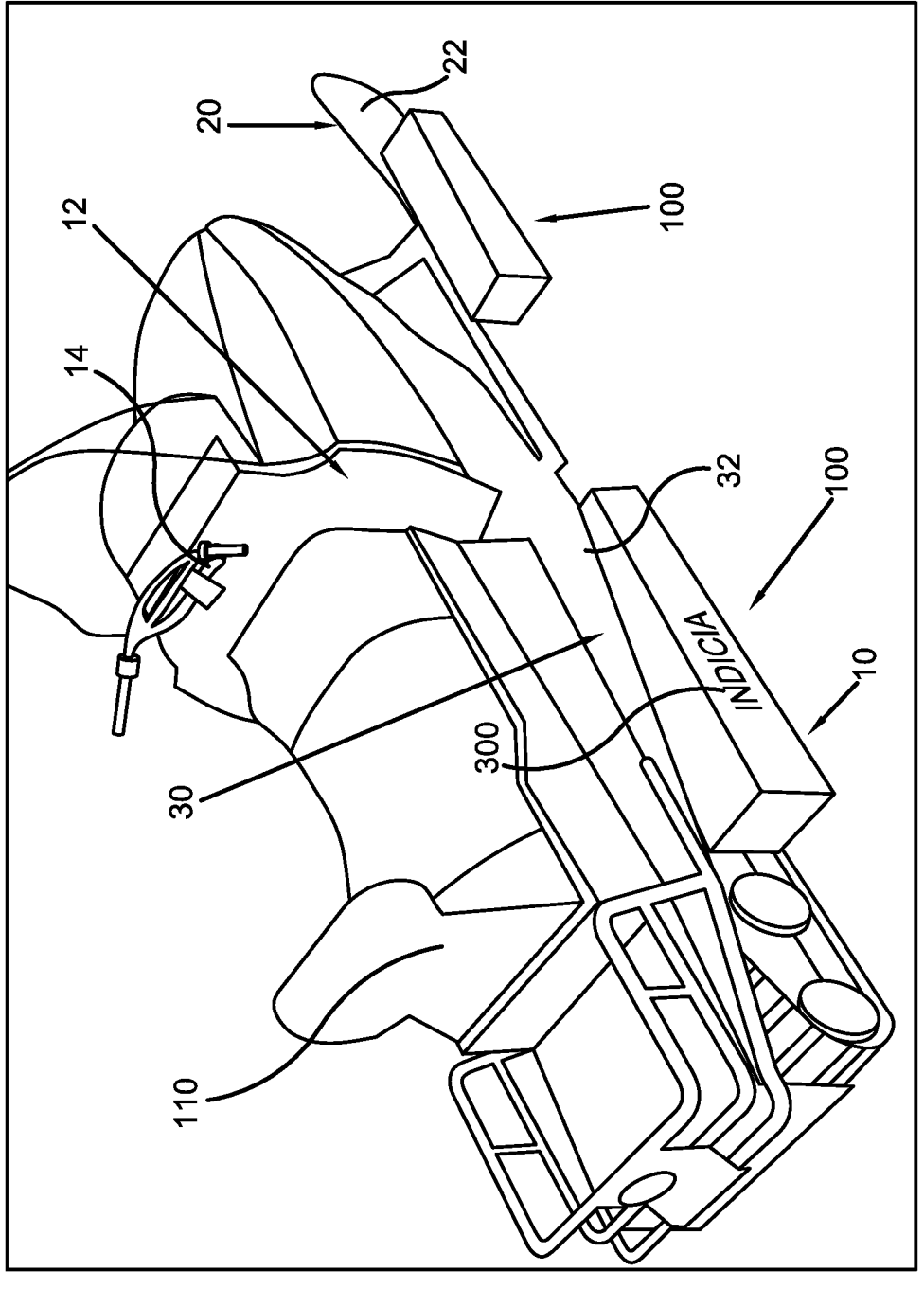
FIG. 1 illustrates a perspective view of one potential embodiment of a snowmobile emergency flotation device of the present invention while attached to a snowmobile in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that prevents a snowmobile from sinking if the snowmobile falls into a body of water. In addition, there exists a long-felt need in the art for a snowmobile emergency flotation device that prevents a snowmobile rider from drowning if a snowmobile falls into a body of water. Further, there is also a long-felt need in the art for a snowmobile emergency flotation device that automatically deploys when a snowmobile falls into a body of water.

The present invention, in one exemplary embodiment, is comprised of a snowmobile emergency flotation device primarily comprised of a body having at least one door and at least one inflatable air bag. In the preferred embodiment of the device the body is manufactured from a durable metal or a rigid plastic. In differing embodiments, the body may further be any color in the art and may be transparent, semi-transparent or opaque. In addition, the body may be comprised of a plurality of indicia such as, but not limited to, patterns, logos, emblems, images, symbols, designs, letters, numbers, words, characters, animals, advertisements, brands, etc.

The body is preferably generally rectangular in shape and is comprised of a top surface and a generally parallel bottom surface, a pair of generally parallel side surfaces, and a rear surface and a generally parallel front surface. In one embodiment, the device may be secured to the top surface of a front ski of a snowmobile. In another embodiment, the device may be secured to the bottom surface of a running board of a snowmobile. To secure the body of the device to a front ski and/or running board, the body is further comprised of at least one fastener. However, in a differing embodiment the body may be inseparably attached to the ski and running board from the factory. The front surface of the body is further comprised of at least one, but preferably two swinging doors. In an embodiment with two doors, a first door attaches to the top surface via at least one hinge and a second door attaches to the bottom surface via at least one hinge. The at least one hinge is preferably a spring-loaded hinge such that the doors remain closed until the device is activated. The doors further preferably only open outwards (i.e., away from the device).

The top surface, side surfaces, bottom surface, and/or rear surface is further comprised of at least one water sensor and at least one manual switch, wherein at least one inflatable air bag is further stored within the body. The air bag is further comprised of at least one ignitor and at least one chemical. Once the water sensor is submerged in water, the sensor sends an electrical communication to the ignitor which creates a spark within the air bag and causes the chemical to ignite such that the air bag rapidly expands and pushes through the doors and travels outside of and away from the body and the snowmobile. Once fully inflated, the air bag becomes buoyant such that the snowmobile floats. The manual switch may also allow a user to manually send the electrical communication to the ignitor to activate the air bag. In one embodiment, the switch may be located on an area of the snowmobile such as, but not limited to, the body and/or handlebars. Further, in said embodiment, multiple devices may be routed to a singular switch such that a user can activate the air bag of each device simultaneously.

Accordingly, the snowmobile emergency flotation device of the present invention is particularly advantageous as it provides a device that prevents a snowmobile from sinking if the snowmobile falls into a body of water, and also prevents a snowmobile rider from drowning a snowmobile falls into a body of water. In addition, the device automatically deploys when a snowmobile falls into a body of water. In this manner, the snowmobile emergency flotation device protects snowmobiles and snowmobile riders.

Referring initially to the drawings, FIG. 1 illustrates a perspective view of one potential embodiment of a snowmobile emergency flotation device 100 of the present invention while attached to a snowmobile in accordance with the disclosed architecture. The device 100 is primarily comprised of a body 110 further comprised of at least one door 152 and at least one inflatable air bag 170. In the preferred embodiment of the device 100 the body 110 is manufactured from a durable metal such as, but not limited to stainless steel or aluminum or a rigid plastic such as, but not limited to, an acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, recycled plastic, biodegradable plastic, etc. In differing embodiments, the body 110 may further be any color in the art and may be transparent, semi-transparent or opaque. In addition, the body 110 may be comprised of a plurality of indicia 300 such as, but not limited to, patterns, logos, emblems, images, symbols, designs, letters, numbers, words, characters, animals, advertisements, brands, etc.

Figure 2A:
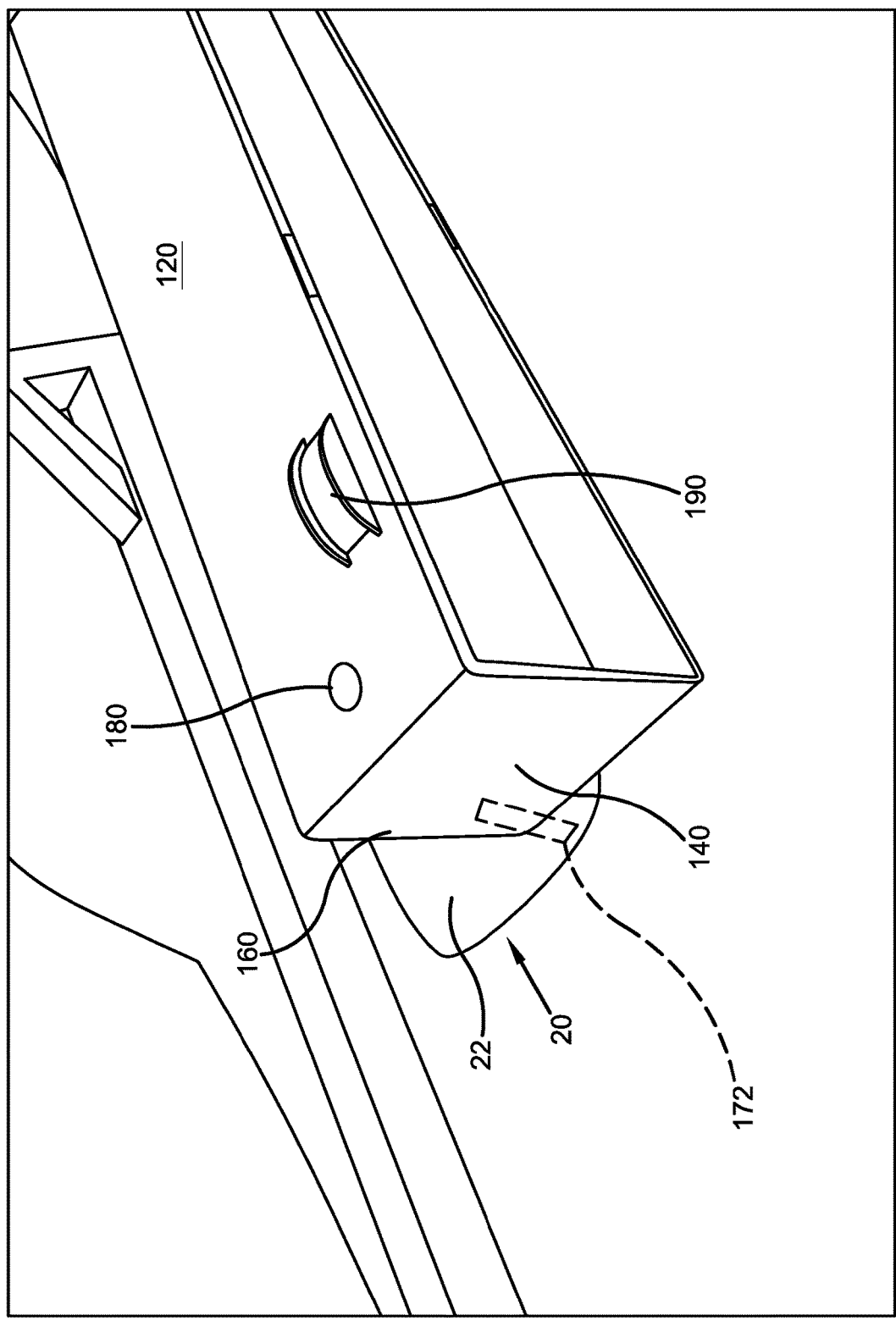
FIG. 2A illustrates an enhanced perspective view of one potential embodiment of a snowmobile emergency flotation device of the present invention while attached to a snowmobile in accordance with the disclosed architecture.
Figure 2B:
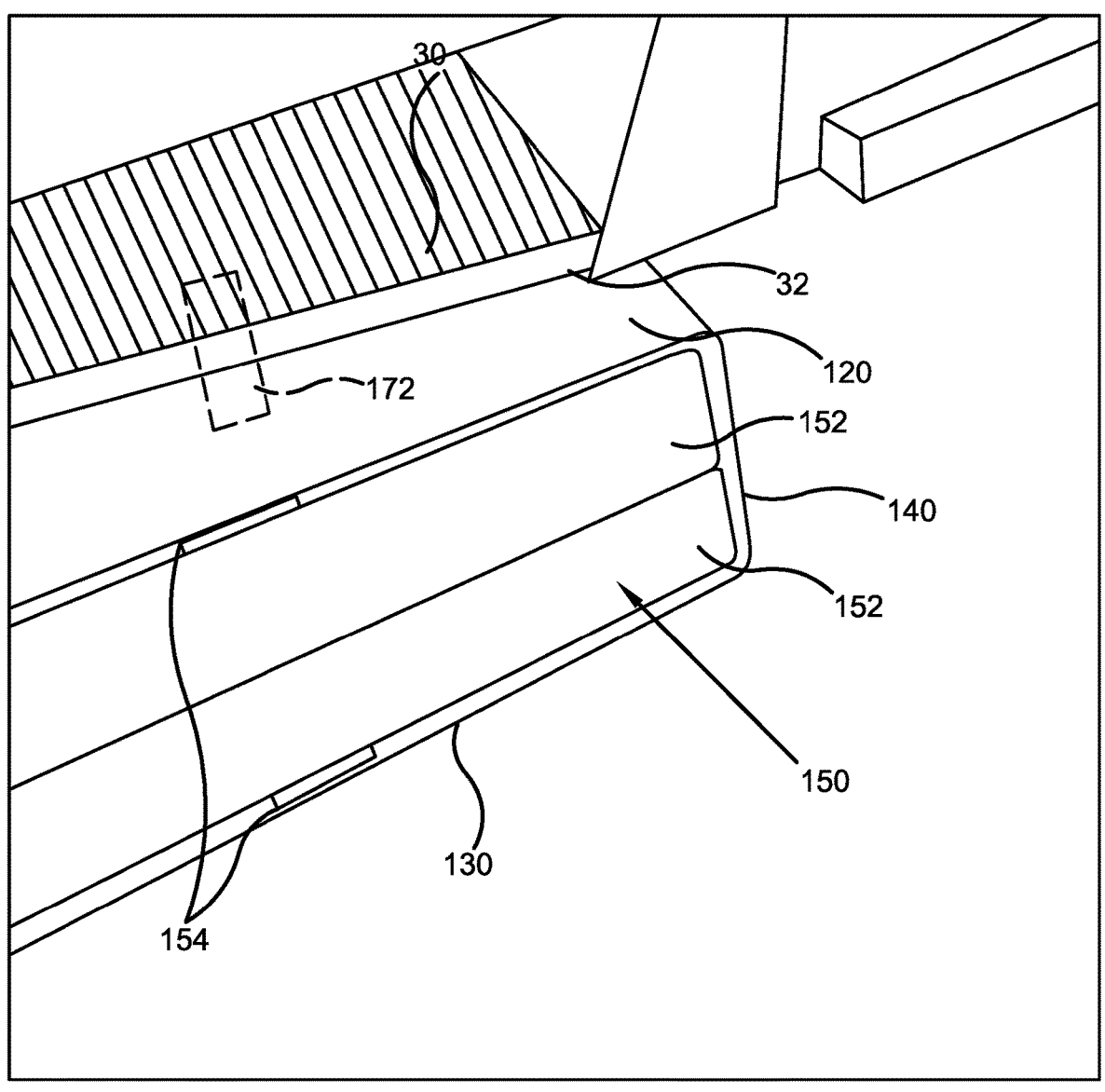
FIG. 2B illustrates an enhanced perspective view of one potential embodiment of a snowmobile emergency flotation device of the present invention while attached to a snowmobile in accordance with the disclosed architecture.

The body 110 is preferably generally rectangular in shape, but in differing embodiments may be any shape known in the art such as, but not limited to, square, circular, triangular, etc. In the preferred embodiment, the body 110 is made up of a top surface 120 and a generally parallel bottom surface 130, a pair of generally parallel side surfaces 140, and a rear surface 160 and a generally parallel front surface 150. In differing embodiments, the device 100 may be secured to a snowmobile 10 in plurality of positions. In one embodiment, the device 100 may be secured to the top surface 22 of a front ski 20 of a snowmobile 10, as seen in FIG. 2A. In another embodiment, the device 100 may be secured to the bottom surface 32 of a running board 30 of a snowmobile 10, as seen in FIG. 2B. However, in the preferred usage of the device 100 multiple devices 100 are secured to a snowmobile 10 such that at least one device 100 is secured to the top surface 22 of both front skis 20 on both sides of a snowmobile 10 and at least one device 100 is secured to the bottom surface 32 of both running boards 30 on both sides of a snowmobile 10. In order to secure the body 110 of the device 100 to a front ski 20 and/or running board 30, the body 110 is further comprised of at least one fastener 172. The at least one fastener 172 may be located on the top surface 120, bottom surface 130, side surfaces 140 and/or rear surface 160 of the body 110. In differing embodiments, the fastener 172 may be any fastener known in the art, such as, but not limited to, a magnet fastener, a screw fastener, a bolt fastener, a tongue and groove fastener assembly, etc. In a differing embodiment, the body 110 may be inseparably attached to the ski 20 and running board 30 from the factory.

Figure 3:
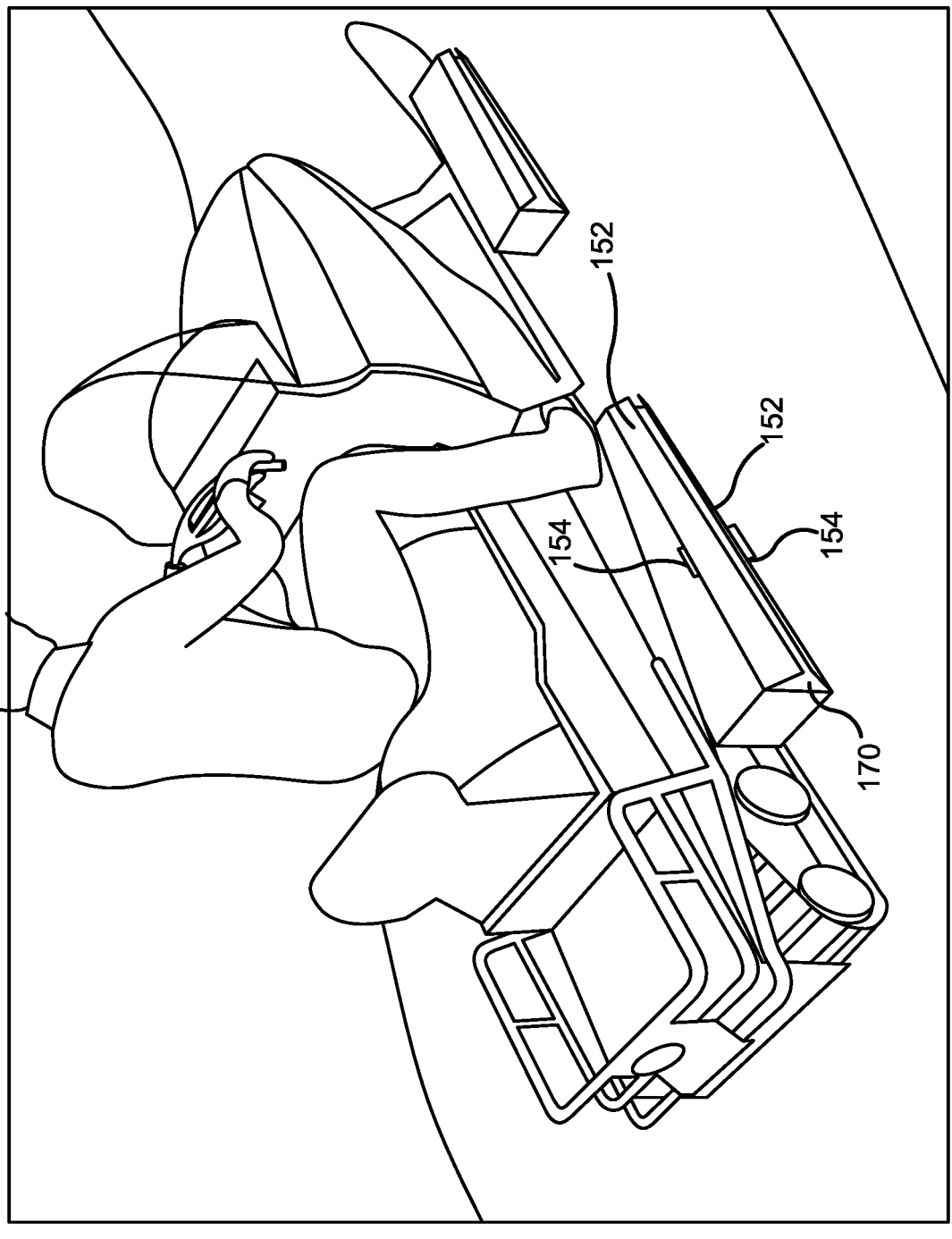
FIG. 3 illustrates a perspective view of one potential embodiment of a snowmobile emergency flotation device of the present invention while attached to a snowmobile in accordance with the disclosed architecture.

FIG. 3 illustrates a perspective view of one potential embodiment of a snowmobile emergency flotation device

100 of the present invention while attached to a snowmobile 10 in accordance with the disclosed architecture. The front surface 150 of the body 110 is further comprised of at least one, but preferably two swinging doors 152. In an embodiment with two doors 152, a first door 152 attaches to the top surface 120 via at least one hinge 154 and a second door 152 attaches to the bottom surface 130 via at least one hinge 154. The at least one hinge 154 is preferably a spring-loaded hinge, such that the doors 152 remain closed until the device 100 is activated. However, in differing embodiments the hinge 154 may be any hinge-type known in the art such as, but not limited to, an offset blind hinge, a knuckle hinge, a butt hinge, a rising butt hinge, a gravity pivot hinge, a ball bearing hinge, a barrel hinge, a concealed hinge, a knife hinge, a piano hinge, a strap hinge, a pivot hinge, a gas-piston hinge, an injection molded hinge, a locking hinge, etc. The doors 152 further preferably only open outwards (i.e., away from the device 100) as seen in FIG. 3.

Figure 4:
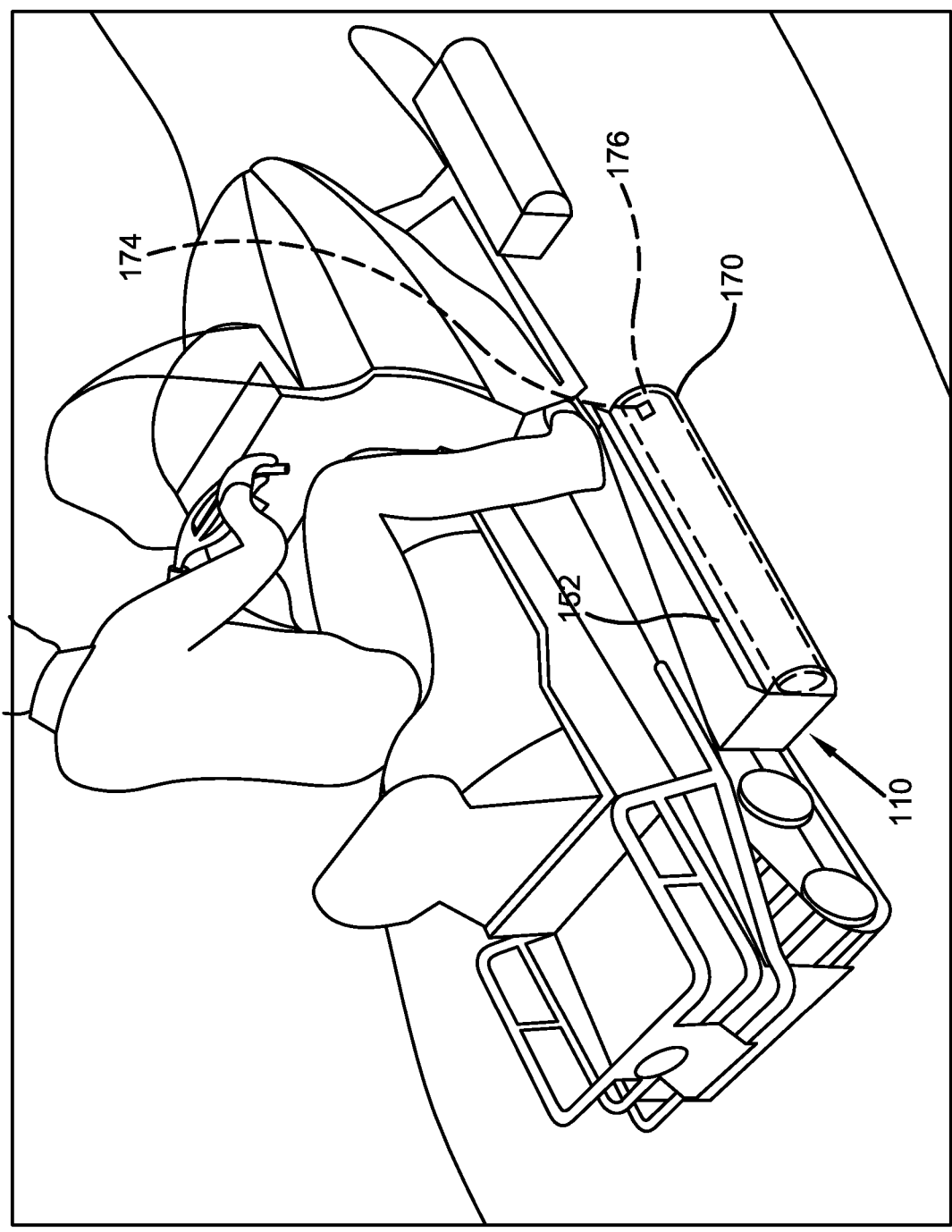
FIG. 4 illustrates a perspective view of one potential embodiment of a snowmobile emergency flotation device of the present invention while attached to a snowmobile and wherein the at least one air bag is fully inflated in accordance with the disclosed architecture.

The top surface 120, side surfaces 140, bottom surface 130 and/or rear surface 160 is further comprised of at least one water sensor 180 and at least one manual switch 190. At least one inflatable air bag 170 is furthered stored within the body 110. The air bag 170 is further comprised of at least one ignitor 174 and at least one chemical 176. The at least one chemical 176 is preferably sodium azide, may be but be any ignitable chemical known in the art that is used in air bags 170. Once the water sensor 180 is submerged in water 5, the sensor 180 sends an electrical communication to the ignitor 174, which creates a spark within the air bag 170. This spark causes the chemical 176 to ignite such that the air bag 170 rapidly expands and pushes through the doors 152 and outside and away from the body 110 and the snowmobile 10, as seen in FIG. 4. Once fully inflated, the air bag 170 becomes buoyant, such that the snowmobile 10 floats.

The manual switch 190 may also allow a user to manually send the electrical communication to the ignitor 174 to activate the air bag 170 once the switch has been flipped. In one embodiment, the switch 190 may be located on an area of the snowmobile 10 such as, but not limited to, the body 12 and/or handlebars 14. Further, in said embodiment, multiple devices 100 may be routed to and controlled by a singular switch 190 such that a user can activate the air bag 170 of each device 100 simultaneously or independently. In a differing embodiment, the at least one manual switch 190 may actually be at least one manual button that can be depressed instead of flipped.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "snowmobile emergency flotation device" and "device" are interchangeable and refer to the snowmobile emergency flotation device 100 of the present invention.

Notwithstanding the forgoing, the snowmobile emergency flotation device 100 of the present invention and its various components can be of any suitable size and configuration as is known in the art without affecting the overall concept of the invention, provided that they accomplish the above-stated objectives. One of ordinary skill in the art will appreciate that the size, configuration and material of the snowmobile emergency flotation device 100 as shown in the FIGS. are for illustrative purposes only, and that many other sizes and shapes of the snowmobile emergency flotation device 100 are well within the scope of the present disclosure. Although the dimensions of the snowmobile emergency flotation device 100 are important design parameters for user convenience, the snowmobile emergency flotation device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A snowmobile emergency flotation device comprising:
at least one air bag;
at least one water sensor;
a manual switch;
at least one fastener;
at least one hinge;
a body comprised of a top surface, a bottom surface, a pair of side surfaces, a front surface and a rear surface; and
a door repositionably attached to the body.

2. The snowmobile emergency flotation device of claim 1, wherein the at least one air bag is stored within the body until deployed.

3. The snowmobile emergency flotation device of claim 2, wherein the at least one air bag is further comprised of at least one ignitor and at least one chemical.

4. The snowmobile emergency flotation device of claim 1, wherein the at least one ignitor can be activated by the at least one water sensor or the manual switch.

5. The snowmobile emergency flotation device of claim 4, wherein when activated the at least one ignitor creates a spark that causes the at least one chemical to ignite and expand the at least one air bag.

6. The snowmobile emergency flotation device of claim 5, wherein the at least one air bag is buoyant when expanded.

7. A snowmobile emergency flotation device comprising:
at least one air bag comprised of an ignitor and a chemical;
at least one water sensor that when submerged in water causes the ignitor to ignite the chemical and expand the at least one air bag;

a manual switch that when activated causes the ignitor to ignite the chemical and expand the at least one air bag;
at least one fastener; and
a body comprised of a top surface, a bottom surface, a pair of side surfaces, a front surface, at least one access panel, and a rear surface.

8. The snowmobile emergency flotation device of claim 7, wherein the at least one access panel attaches to the front surface via at least one hinge.

9. The snowmobile emergency flotation device of claim 7, wherein the at least one fastener is a magnet fastener, a screw fastener, a bolt fastener, or a tongue and groove fastener assembly.

10. The snowmobile emergency flotation device of claim 7, wherein the at least one air bag is buoyant when expanded.

11. The snowmobile emergency flotation device of claim 7, wherein the chemical is a sodium azide.

12. The snowmobile emergency flotation device of claim 7 further comprising a plurality of air bags, wherein each of the plurality of air bags is deployable via the at least one water sensor or the manual switch.

13. The snowmobile emergency flotation device of claim 12 further comprising a plurality of bodies, wherein each of the plurality of bodies houses at least one of the plurality of air bags until deployed.

14. The snowmobile emergency flotation device of claim 13, wherein each of the plurality of bodies comprises a swinging door that is both hinged and spring-loaded such that the swinging door opens outwardly and away from a select one of the plurality of bodies to which it is attached.

15. A snowmobile emergency flotation device comprising:
a plurality of inflatable air bags attached to a snowmobile;
a water sensor that when submerged in water causes the plurality of inflatable air bags to inflate;
a manual switch that when activated causes the plurality of inflatable air bags to inflate;
a plurality of body portions each comprised of an exterior surface and an interior space for housing at least one of the plurality of inflatable air bags until inflated; and
at least one access panel positioned along the exterior surface of each of the plurality of body portions.

16. The snowmobile emergency flotation device of claim 15, wherein each of the plurality of inflatable air bags further comprises an ignitor and a chemical.

17. The snowmobile emergency flotation device of claim 15, wherein each of the plurality of inflatable air bags is buoyant when inflated and extends outwardly through the at least one access panel when inflated.

18. The snowmobile emergency flotation device of claim 16, wherein the chemical is a sodium azide.

19. The snowmobile emergency flotation device of claim 15, wherein each of the plurality of inflatable air bags is deployable via the water sensor or the manual switch.

20. The snowmobile emergency flotation device of claim 19, wherein the at least one access panel further comprises a hinge.

* * * * *